(12) United States Patent
Ono et al.

(10) Patent No.: US 8,897,986 B2
(45) Date of Patent: Nov. 25, 2014

(54) BRAKE SYSTEM AND BRAKE CONTROL METHOD

(75) Inventors: Shunsaku Ono, Kanagawa (JP); Junya Iwatsuki, Kanagawa (JE); Takahiro Ogawa, Kanagawa (JP); Saiji Suzuta, Kanagawa (JP); Mitsuhiro Saito, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 13/995,551

(22) PCT Filed: Oct. 5, 2011

(86) PCT No.: PCT/JP2011/072951
§ 371 (c)(1),
(2), (4) Date: Jun. 19, 2013

(87) PCT Pub. No.: WO2012/086289
PCT Pub. Date: Jun. 28, 2012

(65) Prior Publication Data
US 2013/0282253 A1    Oct. 24, 2013

(30) Foreign Application Priority Data

Dec. 20, 2010 (JP) ................................. 2010-283195

(51) Int. Cl.
*B60T 8/24* (2006.01)
*B60T 8/1755* (2006.01)
*B60T 8/17* (2006.01)
*B60T 8/1763* (2006.01)

(52) U.S. Cl.
CPC ........... *B60T 8/1706* (2013.01); *B60T 2201/16* (2013.01); *B60T 8/1755* (2013.01); *B60T 8/1763* (2013.01)
USPC .......................................................... 701/72

(58) Field of Classification Search
USPC .......................................................... 701/72
See application file for complete search history.

(56) References Cited

U.S. PATENT DOCUMENTS

| 6,851,766 | B2 * | 2/2005 | Ishikawa et al. | 303/139 |
| 8,348,353 | B2 * | 1/2013 | Yamada et al. | 303/143 |
| 2007/0227789 | A1 * | 10/2007 | Imura et al. | 180/65.2 |
| 2009/0184572 | A1 * | 7/2009 | Yamada et al. | 303/140 |

FOREIGN PATENT DOCUMENTS

| JP | H07-002077 | 1/1995 |
| JP | 2004-155412 | 6/2004 |

(Continued)

OTHER PUBLICATIONS

International Search Report for Application No. PCT/JP2011/072951 dated Oct. 27, 2011 (1 page).

*Primary Examiner* — Mary Cheung
*Assistant Examiner* — Anne Mazzara
(74) *Attorney, Agent, or Firm* — Michael Best & Friedrich LLP

(57) ABSTRACT

It is an object of the present invention to control unstable behavior of a vehicle body that arises when braking during turning.
A brake control method for when a two-wheeled motor vehicle is turning includes the steps of: judging whether or not the two-wheeled motor vehicle is turning; calculating a maximum braking force with which slipping of a front wheel will not arise and updating, on the basis of the calculation result, a stored maximum braking force for the front wheel; calculating a maximum braking force with which slipping of a rear wheel will not arise and updating, on the basis of the calculation result, a stored maximum braking force for the rear wheel; limiting the braking forces on the front wheel and the rear wheel to predetermined percentages of the corresponding maximum braking forces in a case where there has been a brake operation by a driver during turning; and bringing the braking forces on the front wheel and the rear wheel that have been limited closer to the corresponding updated maximum braking forces.

20 Claims, 6 Drawing Sheets

(56) References Cited

FOREIGN PATENT DOCUMENTS

| JP | 2004-189075 | 7/2004 |
| JP | 2009-241742 | 10/2009 |
| JP | 2010-12903 | 1/2010 |
| JP | 2010-173452 | 8/2010 |

* cited by examiner

BRAKE SYSTEM AND BRAKE CONTROL METHOD

BACKGROUND OF THE INVENTION

The present invention relates to a brake system and a brake control method for when a two-wheeled motor vehicle is turning.

Conventionally, anti-lock braking systems (ABS) for two-wheeled motor vehicles have been adapted only for while the vehicle body is traveling in a straight line, and braking by the ABS while the vehicle body is turning has had the potential to result in a state in which the behavior of the vehicle body becomes unstable. To eliminate this, various brake control methods for when a two-wheeled motor vehicle is turning are known. In this type of brake control method, for example, travel on a curved road and the extent of an inclined posture are detected by an acceleration sensor, and the braking pressure on the front wheel has been limited by an ABS regulator before it reaches a lock pressure at which the wheels lock (e.g., see JP-A-7-2077).

Further, a two-wheeled motor vehicle brake control method that measures, with a yaw rate sensor, lateral direction inclination of a two-wheeled motor vehicle and uses the measurement result to control the brakes (e.g., see JP-A-2004-155412) and a method that calculates lateral acceleration in a horizontal direction acting on a turning two-wheeled motor vehicle by detecting acceleration with an acceleration sensor whose detection axis is pointed in a direction not coinciding with the front-and-rear direction and the left-and-right direction of the vehicle body (e.g., see JP-A-2009-241742) are known.

SUMMARY OF THE INVENTION

However, in a brake control method that reduces the control threshold value of the ABS during turning or limits the braking force on the front wheel in the neighborhood of the lock pressure, sometimes the bank angle of the vehicle body ends up suddenly rising particularly during the braking of the front wheel, and the behavior of the vehicle body ends up becoming unstable.

It is an object of the present invention to eliminate the problem that the conventional technologies described above have and control unstable behavior of a vehicle body arising during braking while turning.

The present invention provides a brake control method for when a two-wheeled motor vehicle is turning, the brake control method comprising the steps of: judging whether or not the two-wheeled motor vehicle is turning; calculating a maximum braking force with which slipping of a front wheel will not arise and updating, on the basis of the calculation result, a stored maximum braking force for the front wheel; calculating a maximum braking force with which slipping of a rear wheel will not arise and updating, on the basis of the calculation result, a stored maximum braking force for the rear wheel; limiting the braking forces on the front wheel and the rear wheel to predetermined percentages of the corresponding maximum braking forces in a case where there has been a brake operation by a driver during turning; and bringing the braking forces on the front wheel and the rear wheel that have been limited closer to the corresponding updated maximum braking forces.

In this case, the maximum braking force for the front wheel or the rear wheel may be calculated on the basis of the force in the lateral direction acting on the two-wheeled motor vehicle during turning. The maximum braking force for the front wheel or the rear wheel may be calculated on the basis of the speed, lean angle, or each axle load of the two-wheeled motor vehicle. In the step of bringing the braking forces on the front wheel and the rear wheel that have been limited closer to the corresponding maximum braking forces, the amount of rise of the braking forces on the front wheel and the rear wheel may be gradually made larger. The limiting of the braking forces on the front wheel and the rear wheel may be held at constant braking forces for a predetermined amount of time after commencing the limiting. The brake control method may further comprise the step of calculating the coefficient of friction of the front wheel or the rear wheel with respect to a road surface beforehand on the basis of the ground contact condition of the rear wheel with respect to the road surface while the two-wheeled motor vehicle is accelerating, and in the step of calculating the maximum braking force for the front wheel or the rear wheel, the coefficient of friction that has been calculated may be used to calculate the maximum braking force for the front wheel or the rear wheel. The brake control method may further comprise the step of judging whether or not an ABS is in operation, and the predetermined percentages may differ depending on whether or not the ABS is in operation. In the intermittent increases and decreases of the braking forces resulting from the operation of the ABS, the amount of decrease may be made smaller in a case where the two-wheeled motor vehicle is turning than in a case where the two-wheeled motor vehicle is not turning.

The present invention also provides a brake system that performs brake control when a two-wheeled motor vehicle is turning, wherein the brake system judges whether or not the two-wheeled motor vehicle is turning, calculates a maximum value of a braking force with which slipping of a front wheel will not arise and a maximum braking force with which slipping of a rear wheel will not arise, updates, on the basis of the calculation results, stored maximum braking forces for the front wheel and the rear wheel, limits the braking forces on the front wheel and the rear wheel to predetermined percentages of the corresponding maximum braking forces in a case where there has been a brake operation by a driver during turning, and brings the braking forces on the front wheel and the rear wheel that have been limited closer to the corresponding updated maximum braking forces.

In this case, the maximum braking force for the front wheel or the rear wheel may be calculated on the basis of the force in the lateral direction acting on the two-wheeled motor vehicle during turning. The maximum braking force for the front wheel or the rear wheel may be calculated on the basis of the speed, lean angle, or each axle load of the two-wheeled motor vehicle. When bringing the braking forces on the front wheel and the rear wheel that have been limited closer to the corresponding maximum braking forces, the brake system may gradually make the amount of rise of the braking forces on the front wheel and the rear wheel larger. The limiting of the braking forces on the front wheel and the rear wheel may be held at constant braking forces for a predetermined amount of time after commencing the limiting. The brake system may calculate the coefficient of friction of the front wheel or the rear wheel with respect to a road surface beforehand on the basis of the ground contact condition of the rear wheel with respect to the road surface while the two-wheeled motor vehicle is accelerating, and when calculating the maximum braking force for the front wheel or the rear wheel, the brake system may use the coefficient of friction that has been calculated to calculate the maximum braking force for the front wheel or the rear wheel. The brake system may judge whether or not an ABS is in operation, and the predetermined percentages may differ depending on whether or not the ABS is in operation. In the intermittent increases and decreases of the braking force by the ABS, the amount of decrease may be made smaller in a case where the two-wheeled motor vehicle is turning than in a case where the two-wheeled motor vehicle is not turning.

The present invention can control unstable behavior of a vehicle body that arises during braking while turning.

DETAILED DESCRIPTION

A preferred embodiment of the present invention will be described below with reference to the drawings.

Figure 1:
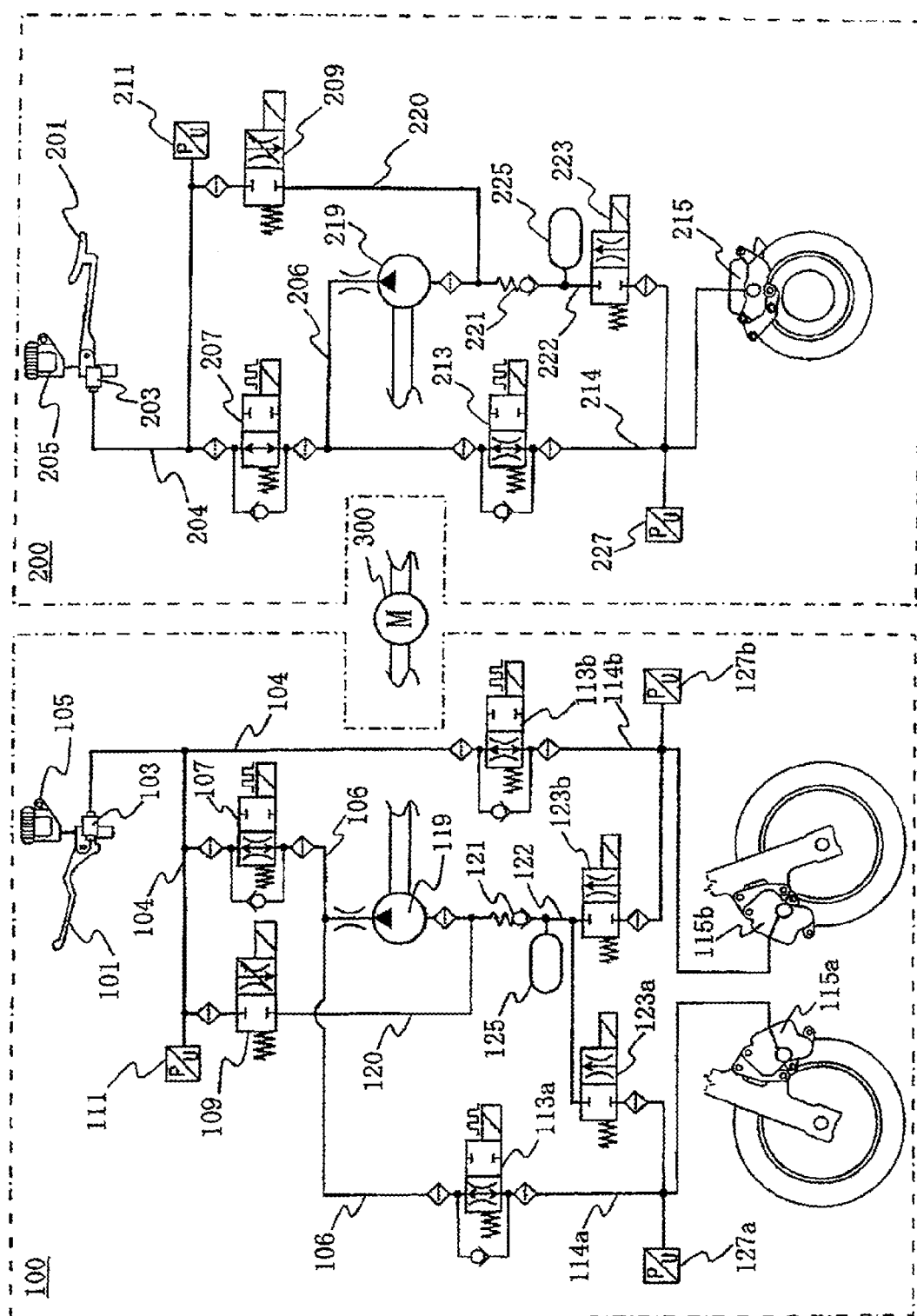
FIG. 1 is a circuit diagram showing a hydraulic circuit pertaining to an embodiment of the present invention.

FIG. 1 shows a hydraulic circuit of a brake system pertaining to the present embodiment. The brake system is installed in a two-wheeled motor vehicle and is equipped with a front wheel hydraulic circuit 100, a rear wheel hydraulic circuit 200, and a DC motor 300 that drives hydraulic pumps of the front wheel hydraulic circuit 100 and the rear wheel hydraulic circuit 200. The hydraulic circuit is filled with brake fluid.

The front wheel hydraulic circuit 100 is equipped with a brake lever 101 that is operated by the right hand of a driver, a front wheel-side master cylinder 103 that is pressurized when the brake lever 101 is operated, a front wheel-side master cylinder reservoir 105 that is connected to the front wheel-side master cylinder 103, a front wheel-side switching valve 107 that is connected via a conduit line 104 to the front wheel-side master cylinder 103, and a front wheel-side suction valve 109 that is connected via the conduit line 104 to the front wheel-side master cylinder 103. A filter is disposed in the section where the conduit line 104 and the front wheel-side switching valve 107 are interconnected and in the section where the conduit line 104 and the front wheel-side suction valve 109 are interconnected. Moreover, a pressure sensor 111 is disposed in the conduit line 104, and the pressure sensor 111 is disposed to detect the pressure between the front wheel-side master cylinder 103 and the front wheel-side switching valve 107 and front wheel-side suction valve 109 and sends it to a later-described ECU 400 that is an electronic control unit.

A front wheel-side first inlet valve 113a is connected via a conduit line 106 to the front wheel-side switching valve 107. A filter is also disposed in the section where the front wheel-side switching valve 107 and the conduit line 106 are interconnected and in the section where the front wheel-side first inlet valve 113a and the conduit line 106 are interconnected. The front wheel-side first inlet valve 113a is connected to a front wheel-side first caliper 115a via a conduit line 114a.

A front wheel-side second inlet valve 113b is directly connected to the conduit line 104. A filter is also disposed in the section where the front wheel-side second inlet valve 113b and the conduit line 104 are interconnected. The front wheel-side second inlet valve 113b is connected to a front wheel-side second caliper 115b via a conduit line 114b.

The hydraulic circuit pertaining to the present embodiment is connected to a front wheel brake that is operated by the front wheel hydraulic circuit 100. The front wheel brake is configured from a front wheel first brake including the front wheel-side first caliper 115a and a front wheel second brake including the front wheel-side second caliper 115b.

The front wheel-side first caliper 115a is connected via the conduit line 114a to the front wheel-side first inlet valve 113a as described above. The front wheel-side second caliper 115b is connected via the conduit line 114b to the front wheel-side second inlet valve 113b as described above.

The discharge side of a front wheel-side hydraulic pump 119 is connected via a restrictor to the conduit line 106. The suction side of the front wheel-side hydraulic pump 119 is connected to a conduit line 120 via a filter. The front wheel-side hydraulic pump 119 is driven by the DC motor 300. Further, one end of a front wheel-side first check valve 121 is connected to the conduit line 120. Moreover, the discharge port of the front wheel-side suction valve 109 is connected to the conduit line 120. Further, the other end of the front wheel-side first check valve 121 is connected to a conduit line 122. The front wheel-side first check valve 121 is placed to prevent reverse flow from the conduit line 120 to the conduit line 122.

Further, the discharge ports of front wheel-side outlet valves 123a and 123b are connected to the conduit line 122. Moreover, a front wheel-side accumulator 125 is connected to the conduit line 122 between the front wheel-side check valve 121 and the front wheel-side outlet valves 123a and 123b.

The inflow end of the front wheel-side first outlet valve 123a is connected via the conduit line 114a to the front wheel-side first caliper 115a. The outflow port of the front wheel-side first outlet valve 123a is connected to the conduit line 122. Further, a filter is disposed in the section where the inflow port of the front wheel-side first outlet valve 123a and the conduit line 114a are interconnected. A pressure sensor 127a is disposed in the conduit line 114a. The pressure sensor 127a measures the pressure inside the conduit line 114a and sends a pressure signal to the ECU 400.

Moreover, the inflow port of the front wheel-side second outlet valve 123b is connected via the conduit line 114b to the front wheel-side second caliper 115b. The outflow port of the front wheel-side second outlet valve 123b is connected to the conduit line 122. Further, a filter is disposed in the section where the inflow port of the front wheel-side second outlet valve 123b and the conduit line 114b are interconnected. A pressure sensor 127b is disposed in the conduit line 114b, and the pressure sensor 127b measures the pressure inside the conduit line 114b and sends a pressure signal to the ECU 400. The pressure in the conduit line 114b does not become higher than the pressure in the conduit line 114a, and the pressure in the conduit line 114a is detected by the pressure sensor 127a, so the pressure sensor 127b can also be omitted.

Next, the configuration of the rear wheel hydraulic circuit 200 will be described using FIG. 1. The rear wheel hydraulic circuit 200 is equipped with a brake pedal 201 that is operated by the right foot of the driver, a rear wheel-side master cylinder 203 that is pressurized when the brake pedal 201 is operated, a rear wheel-side master cylinder reservoir 205 that is connected to the rear wheel-side master cylinder 203, a rear wheel-side switching valve 207 that is connected via a conduit line 204 to the rear wheel-side master cylinder 203, and a rear wheel-side suction valve 209 that is connected via the conduit line 204 to the rear wheel-side master cylinder 203. A filter is disposed in the section where the conduit line 204 and the rear wheel-side switching valve 207 are interconnected and in the section where the conduit line 204 and the rear wheel-side suction valve 209 are interconnected. Moreover, a pressure sensor 211 is disposed in the conduit line 204, and the pressure sensor 211 detects the pressure between the rear wheel-side master cylinder 203 and the rear wheel-side switching valve 207 and rear wheel-side suction valve 209 and sends it to the ECU 400.

Further, a rear wheel-side inlet valve 213 is connected via a conduit line 206 to the rear wheel-side switching valve 207. A filter is also disposed in the section where the rear wheel-side switching valve 207 and the conduit line 206 are interconnected and in the section where the rear wheel-side inlet valve 213 and the conduit line 206 are interconnected. The rear wheel-side inlet valve 213 is connected to a rear wheel-side caliper 215 via a conduit line 214. A rear wheel brake is configured from the rear wheel-side caliper 215. Additionally, the rear wheel-side caliper 215 is connected via the conduit line 214 to the rear wheel-side inlet valve 213 as described above.

The discharge side of a rear wheel-side hydraulic pump 219 is connected via a restrictor to the conduit lint 206. The suction side of the rear wheel-side hydraulic pump 219 is connected to a conduit line 220 via a filter. The rear wheel-side hydraulic pump 219 is driven by the DC motor 300. Further, one end of a rear wheel-side check valve 221 is connected to the conduit line 220. Moreover, the discharge port of the rear wheel-side suction valve 209 is connected to the conduit line 220. Further, the other end of the rear wheel-side check valve 221 is connected to a conduit line 222. The rear wheel-side check valve 221 is placed to prevent reverse flow from the conduit line 220 to the conduit line 222.

Further, the discharge port of a rear wheel-side outlet valve 223 is connected to the conduit line 222. Moreover, a rear wheel-side accumulator 225 is connected to the conduit line 222 between the rear wheel-side check valve 221 and the rear wheel-side outlet valve 223.

The rear wheel-side caliper 215 is connected to the inflow port of the rear wheel-side outlet valve 223 via the conduit line 214. The outflow port of the rear wheel-side outlet valve 223 is connected to the conduit line 222. Further, a filter is disposed in the section where the inflow port of the rear wheel-side outlet valve 223 and the conduit line 214 are interconnected. A pressure sensor 227 is disposed in the conduit line 214, and the pressure sensor 227 measures the pressure inside the conduit line 214 and sends a pressure signal to the ECU 400.

Figure 2:
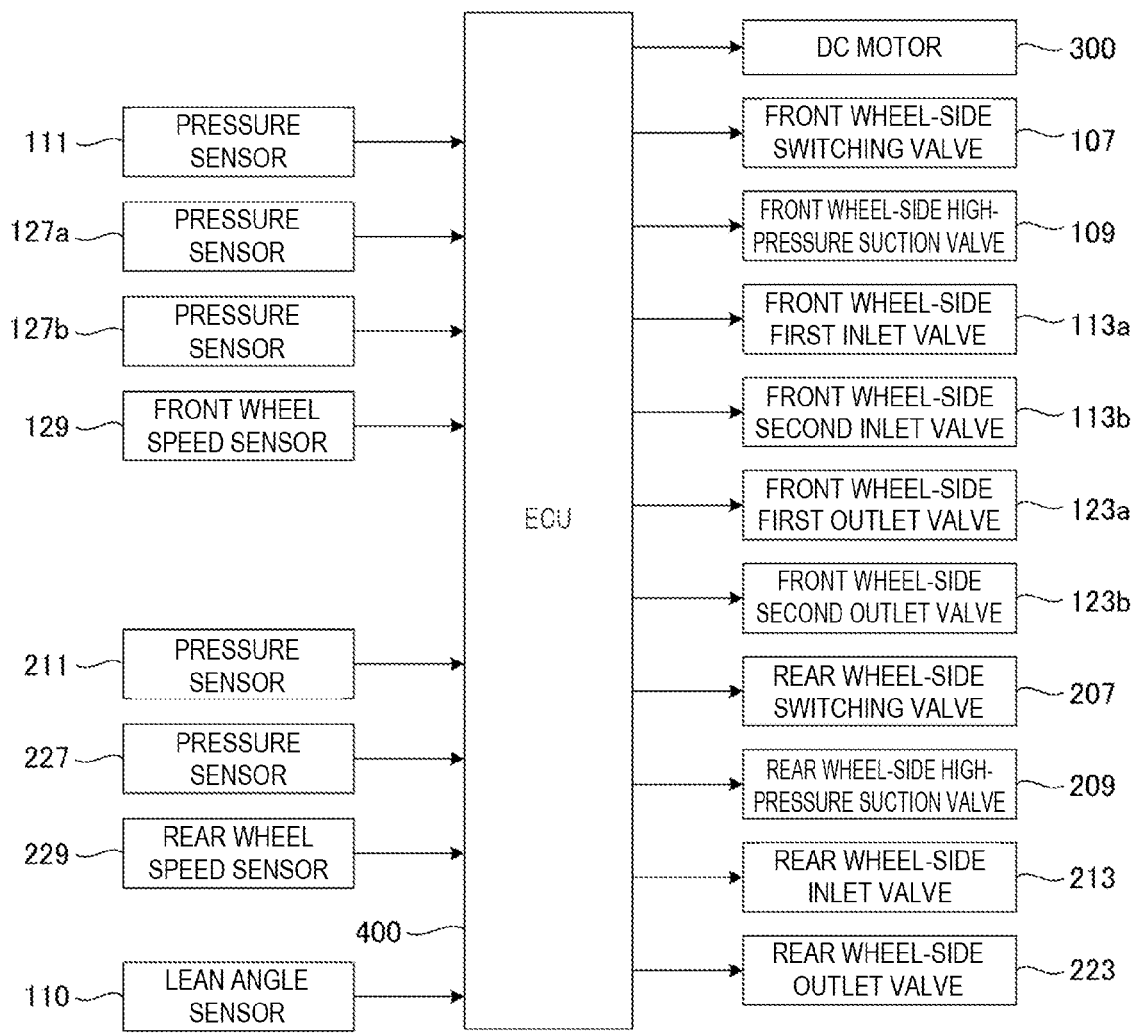
FIG. 2 is a block diagram showing a functional configuration resulting from an ECU.

The hydraulic circuit shown in FIG. 1 is controlled by the ECU 400, which is an electronic control unit shown in the block diagram of FIG. 2. The pressure sensors 111, 127a, and 127b and a front wheel speed sensor 129 that detects the rotational speed of the front wheel are connected to the ECU 400. The pressure sensors 111, 127a, and 127b send pressure signals indicating the pressures inside the conduit lines 104, 114a, and 114b to the ECU 400, and the front wheel speed sensor 129 sends a rotational speed signal indicating the rotational speed of the front wheel to the ECU 400. Moreover, the pressure sensors 211 and 227 and a rear wheel speed sensor 229 that detects the rotational speed of the rear wheel are connected to the ECU 400. The pressure sensors 211 and 227 send pressure signals indicating the pressures inside the conduit lines 204 and 214 to the ECU 400, and the rear wheel speed sensor 229 sends a rotational speed signal indicating the rotational speed of the rear wheel to the ECU 400.

Further, the ECU 400 operates the DC motor 300, the front wheel-side switching valve 107, the front wheel-side suction valve 109, the front wheel-side first inlet valve 113a, the front wheel-side second inlet valve 113b, the front wheel-side first outlet valve 123a and the front wheel-side second outlet valve 123b in accordance with a predetermined condition on the basis of the pressure signals and the speed signal. Moreover, the ECU 400 operates the rear wheel-side switching valve 207, the rear wheel-side suction valve 209, the rear wheel-side inlet valve 213, and the rear wheel-side outlet valve 223 in accordance with a predetermined condition on the basis of the pressure signals and the speed signal. Each of the aforementioned valves is an electromagnetic valve equipped with a solenoid and is switched between an open state and a closed state when an electric current is passed through it by the ECU 400.

Moreover, in a case where the ECU 400 has received the rotational speed signals from the front wheel speed sensor 129 and the rear wheel speed sensor 229 and detected wheel lock during braking, the ECU 400 causes an anti-lock braking system (ABS) to operate, operates the hydraulic pumps, opens and closes each of the valves, controls the braking forces, and prevents wheel lock.

In the two-wheeled motor vehicle pertaining to the present embodiment, a lean angle sensor 110 for detecting the lean angle (bank angle); that is, the angle of inclination of the vehicle body; is disposed on the vehicle body. The ECU 400 is further connected to the lean angle sensor 110 and is disposed in such a way that it can acquire a lean angle signal corresponding to the angle of inclination of the vehicle body from the lean angle sensor 110. Because of this, the ECU 400 can calculate the turning force in the horizontal direction acting on the vehicle body while turning; that is, centrifugal force, which is a force in a lateral direction; on the basis of the lean angle signal acquired from the lean angle sensor 110 and the rotational speed signal of the front wheel or the rear wheel acquired from the front wheel speed sensor 129 or the rear wheel speed sensor 229.

Figure 3:
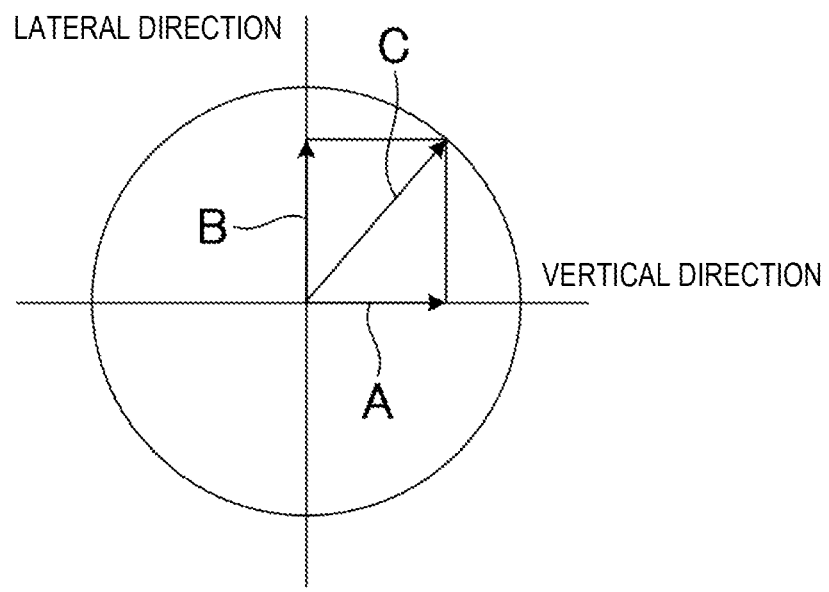
FIG. 3 is a schematic diagram showing an outline of a method of calculating maximum braking force.

FIG. 3 is a schematic diagram showing an outline of a method of calculating maximum braking force.

As shown in FIG. 3, the ECU 400 pertaining to the present embodiment uses the theory of the tire friction circle to calculate maximum braking force during turning indicated by arrow B in the drawing from the turning force of the vehicle body indicated by arrow A in the drawing. Here, maximum braking force is the maximum value of braking force that can arise in the vertical direction, which is the traveling direction of the wheels. The ECU 400 uses the theory of the tire friction circle, in which axle load is reflected, to calculate the maximum braking force from the calculated turning force. The ECU 400 stores the previously calculated maximum braking force in an unillustrated memory such as an EEPROM or a RAM and updates the stored maximum braking force on the basis of the newly calculated maximum braking force.

Axle load is the load on the axle of the wheel for calculating the maximum braking force, and because the axle load changes depending on the acceleration and deceleration of the vehicle body, in the present embodiment, the axle load is calculated from the acceleration in the front-and-rear direction and the left-and-right direction of the vehicle body.

In the tire friction circle, the larger the axle load is, and the larger the coefficient of friction of the road surface is, the larger the radius of the friction circle indicated by arrow C in the drawing is. For this reason, in the present embodiment, the ECU 400 determines the radius of the friction circle with coefficient of friction $\mu=1.0$, but the ECU 400 may also calculate the maximum braking force from the actual coefficient of friction of the front wheel and the rear wheel with respect to the road surface. The actual coefficient of friction can, for example, be calculated on the basis of the ground contact condition of the rear wheel with respect to the road surface, such as the slight slipping of the rear wheel that arises when the vehicle body accelerates, the drive torque, or the lean angle signal. Specifically, first, the ECU 400 calculates the load of each wheel from the vehicle body acceleration and corrects the calculated load of each wheel on the basis of the moment weight in the rolling direction calculated from the vehicle body speed and the lean angle. Next, the ECU 400 estimates the road surface µ (coefficient of friction) from the amount of slip, the load of each wheel after correction, and the ground contact area of the tire with respect to the road surface estimated from the lean angle, and judges the ground contact condition of the tire.

In the calculation of the maximum braking force by the ECU 400, the ECU 400 may also apply the value of the turning force to an equation corresponding to the tire friction circle and calculate it or store a map corresponding to the tire friction circle in a memory beforehand and calculate the value of the turning force by referencing the map.

Figure 4:
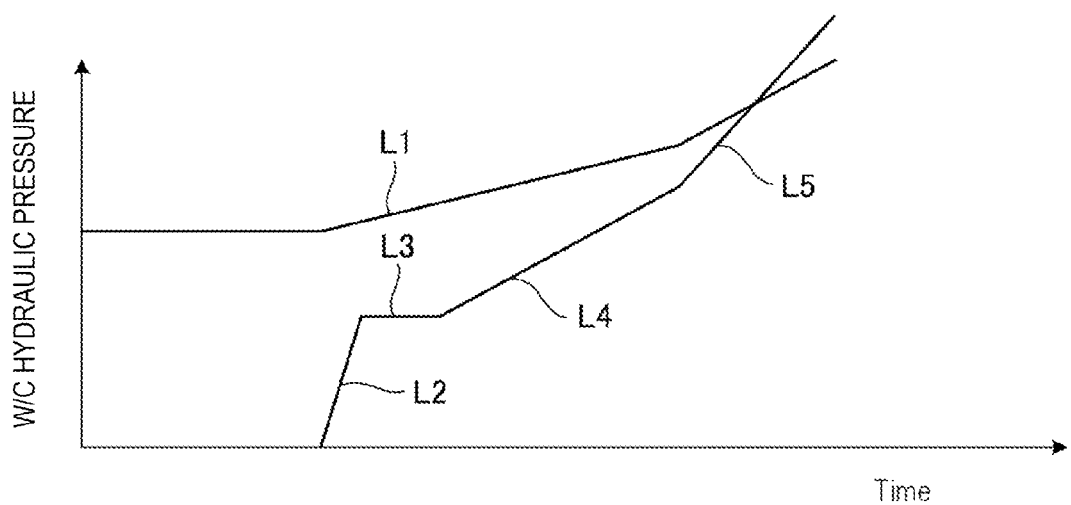
FIG. 4 is a schematic diagram showing brake control of a front wheel.

FIG. 4 is a schematic diagram showing brake control of the front wheel. The vertical axis represents the hydraulic pressure of the brake fluid supplied to wheel cylinders disposed in the front wheel-side first and second calipers 115a and 115b, and the horizontal axis represents elapsed time. In the drawing, line L1 shows the hydraulic pressure of the brake fluid corresponding to the maximum braking force in the vertical direction that can arise in the wheel, and the front wheel produces the maximum braking force when the hydraulic pressure of the brake fluid supplied to the wheel cylinders has reached line L1. Lines L2 to L5 show the actual change in the hydraulic pressure of the brake fluid resulting from control by the ECU 400 when the driver has operated the brake lever 101 (see FIG. 1) to apply braking force to the front wheel in a state in which the ABS is not intervening.

When braking force is generated in the vehicle body, the vehicle body decelerates, whereby the load moves forward, the load acting on the front wheel increases, the radius of the aforementioned friction circle becomes larger, and the turning force in the lateral direction decreases. For this reason, line L1, which shows the maximum braking force for the front wheel, rises after the hydraulic pressure of the brake fluid rises as shown by line L2 and generates braking force.

The control of the hydraulic pressure of the brake fluid in the front wheel is focused on preventing a sudden rise in the bank angle of the vehicle body; that is, preventing the lean angle from suddenly becoming shallower.

When the driver operates the brake lever 101 to apply braking force, the hydraulic pressure of the brake fluid rises in response to the operation of the brake lever 101 as shown by line L2.

When the hydraulic pressure of the brake fluid becomes a predetermined percentage of the maximum braking force, the ECU 400 (see FIG. 2) limits the hydraulic pressure of the brake fluid supplied to the wheel cylinders in such a way that the hydraulic pressure does not rise any further, even if the driver operates the brake lever 101, by controlling the front wheel hydraulic circuit 100 as shown by line L3. At this time, the ECU 400 can control the limiting of the hydraulic pressure of the brake fluid inside the wheel cylinders with high precision by using the pressure sensors 127a and 127b to measure the hydraulic pressures inside the conduit lines 114a and 114b connected to the wheel cylinders of the front wheel-side first and second calipers 115a and 115b. The predetermined percentage of the maximum braking force is a percentage where the driver does not feel that a rise in the bank angle of the vehicle body or sliding of the rear wheel has suddenly arisen, and it is preferred that the predetermined percentage be in the range of 30% to 60% of the maximum braking force. The limiting by the ECU 400 is performed in such a way that, even in a case where the maximum braking force has fluctuated, the hydraulic pressure becomes constant; that is, the limiting is held at a constant braking force; for a predetermined amount of time after commencing the limiting as shown by line L3.

When the predetermined amount of time elapses after commencing the limiting, the ECU 400 gradually brings the braking force on the front wheel closer to the maximum braking force as shown by line L4 and line L5. At this time, it is preferred that the amount of rise of the braking force gradually become larger, that the amount of rise of the hydraulic pressure be larger in the region of line L5 than in line L4, and that the ECU 400 limit the hydraulic pressure in such a way as to gradually raise the braking force to the maximum braking force in the range of 0.5 second to 2 seconds after commencing the limiting of the hydraulic pressure of the brake fluid.

Figure 5:
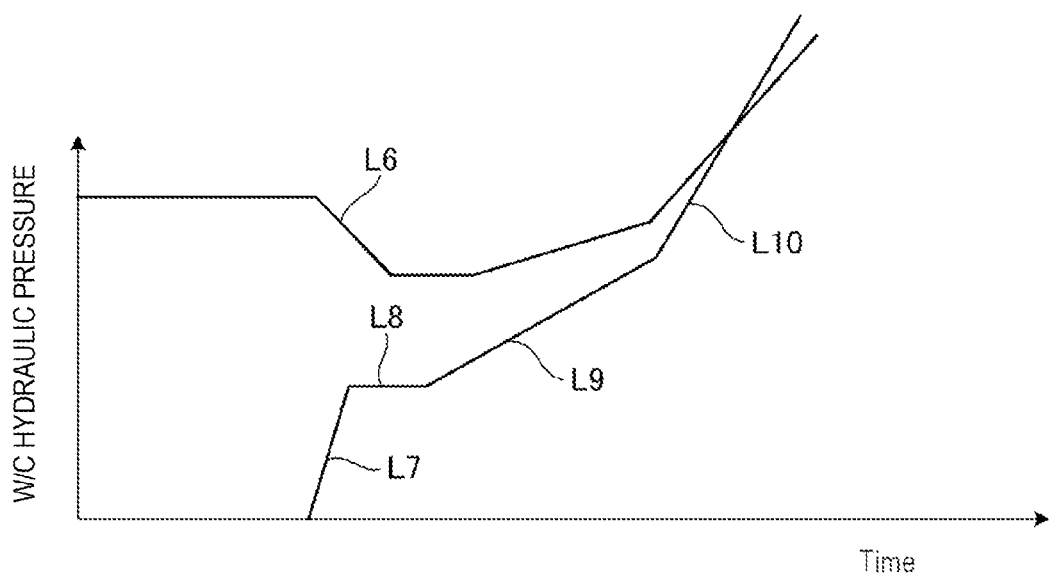
FIG. 5 is a schematic diagram showing brake control of a rear wheel.

FIG. 5 is a schematic diagram showing brake control of the rear wheel. The vertical axis represents the hydraulic pressure of the brake fluid supplied to a wheel cylinder disposed in the rear wheel-side caliper 215, and the horizontal axis represents elapsed time. In the drawing, line L6 shows the hydraulic pressure of the brake fluid corresponding to the maximum braking force in the vertical direction that can arise in the rear wheel and corresponds to line L1 of the front wheel (see FIG. 4). Lines L7 to L10 show the actual change in the hydraulic pressure of the brake fluid resulting from control by the ECU 400 when the driver has operated the brake pedal 201 (see FIG. 1) to apply braking force to the rear wheel in a state in which the ABS is not intervening. The brake control of the rear wheel is substantially identical to the brake control of the front wheel, and lines L7 to L10 of the rear wheel correspond to lines L2 to L5 of the front wheel.

When braking force is generated in the vehicle body, the vehicle body decelerates, whereby the load moves forward, the load acting on the rear wheel decreases, the radius of the aforementioned friction circle becomes smaller, and drag torque resulting from the engine affects the rear wheel that is the drive wheel. For this reason, the maximum braking force for the rear wheel becomes a value obtained by finding the actual maximum braking force that has been found from the turning force in the lateral direction and the load acting on the rear wheel when the braking force has been generated in the vehicle body and subtracting the effect resulting from the drag torque of the engine from that value.

The control of the hydraulic pressure of the brake fluid in the rear wheel is focused on securing stability by keeping the braking force on the rear wheel low and making the sliding of the wheels smooth in such a way that the wheels do not suddenly slip and the behavior of the vehicle body does not become unstable. The brake control of the rear wheel is also executed in the same way as the brake control of the front wheel, but the way in which the load acts on the rear wheel differs from that of the front wheel due to the shift in the load on the vehicle body and so forth. For this reason, the maximum braking force for the rear wheel, the value of the predetermined percentage with respect to the maximum braking force when limiting the hydraulic pressure of the brake fluid, and the amount of rise of the braking force when gradually bringing the braking force closer to the maximum braking force differ from those in the case of brake control of the front wheel.

The brake control pertaining to the present embodiment is executed even during ABS control in which the ABS is in operation before the vehicle body starts turning, such a case where, for example, the vehicle body turns in a state in which the ABS has operated while traveling in a straight line. During ABS control, the braking force increases and decreases intermittently, but the ECU 400 limits the hydraulic pressure in such a way that the increase in the braking force; that is, the slope of the increase in the hydraulic pressure; becomes gentle. During operation when the ABS is in operation, the aforementioned predetermined percentage of the maximum braking force differs from during non-operation when the ABS is not in operation, and the braking force is limited to a braking force that is higher when the ABS is in operation than when the ABS is not in operation, for example. Further, the ECU 400 makes the amount of decrease of the braking force when the braking force is intermittently increased and decreased by the operation of the ABS; that is, the amount of decrease at the time of a decrease of the hydraulic pressure; smaller than in a case where a turning force is not arising in the vehicle body.

Figure 6:
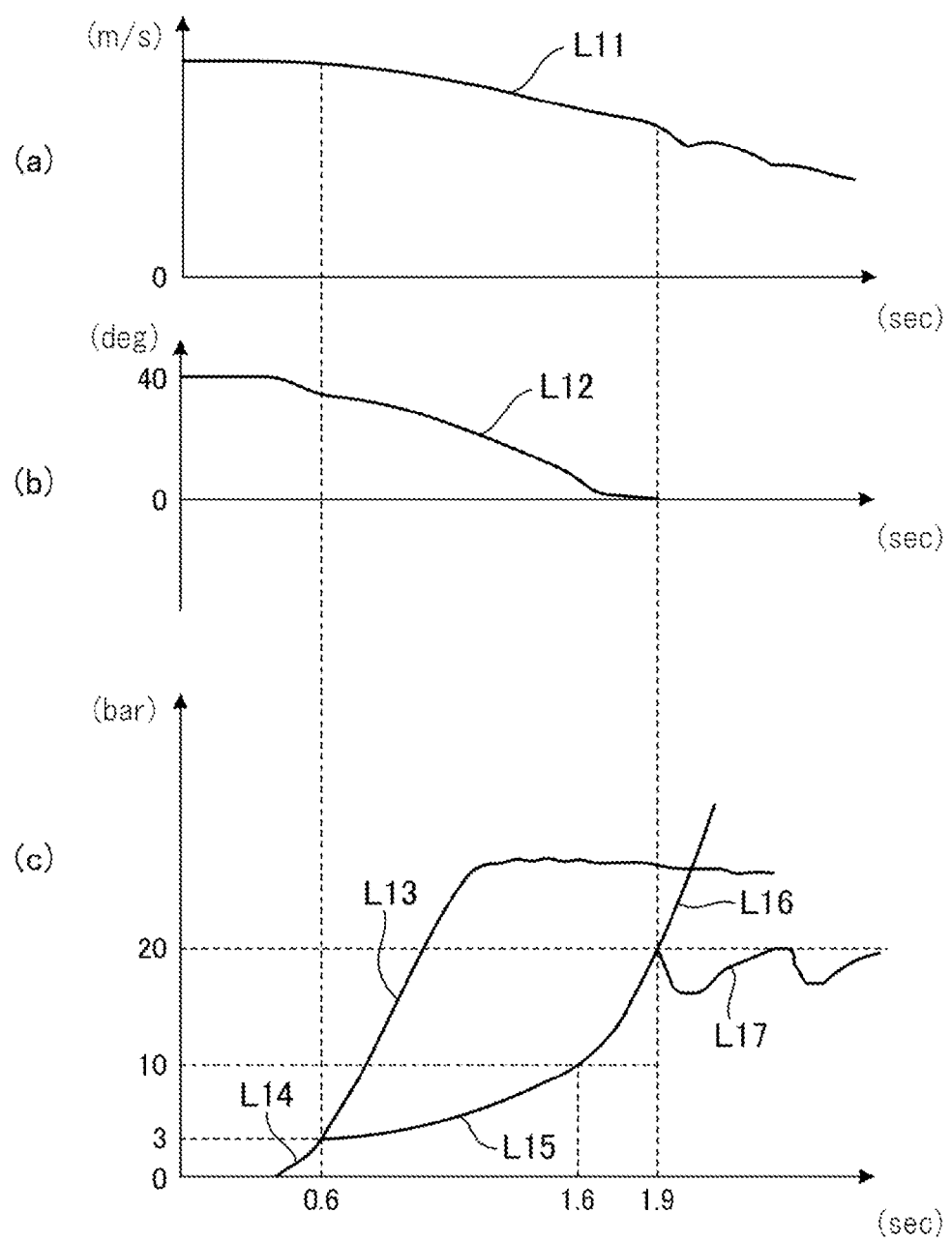
FIG. 6(a) is a diagram showing wheel speed during actual brake control.
FIG. 6(b) is a diagram showing lean angle during actual brake control.
FIG. 6(c) is a diagram showing actual brake control.

FIG. 6(*a*) to FIG. 6(*c*) are diagrams showing actual brake control. The horizontal axes in FIG. 6(*a*) to FIG. 6(*c*) correspond to one another, and here, brake control of the front wheel will be described as an example.

FIG. 6(*a*) shows the speed (m/s) of the wheel on the vertical axis and shows elapsed time (sec) on the horizontal axis. Line L11 shows the change in the wheel speed accompanied by the limiting of the braking force and the operation of the ABS.

FIG. 6(*b*) shows the lean angle (deg) on the vertical axis and shows elapsed time (sec) on the horizontal axis. Line L12 shows the change in the lean angle accompanied by the limiting of the braking force and the operation of the ABS.

FIG. 6(*c*) shows the hydraulic pressure (bar) of the brake fluid supplied to the wheel cylinders disposed in the front wheel-side first and second calipers 115*a* and 115*b* (see FIG. 1) on the vertical axis and shows elapsed time (sec) on the horizontal axis. In FIG. 6(*c*), line L13 and line L14 show, as targets for comparison, the change in the hydraulic pressure of the brake fluid supplied to the wheel cylinders disposed in the front wheel-side first and second calipers 115*a* and 115*b* when the driver has operated the brake lever 101 in a case not accompanied by the limiting of the braking force and the operation of the ABS. Line L14 to line L16 shows the change in the limit value of the hydraulic pressure of the brake fluid supplied to the wheel cylinders disposed in the front wheel-side first and second calipers 115*a* and 115*b* when the limiting of the braking force has been performed. Further, line L17 shows the change in the hydraulic pressure of the brake fluid supplied to the wheel cylinders when the ABS has operated. In FIG. 6(*c*), line L14 corresponds to line L2 of FIG. 4, and line L15 and line L16 correspond to line L3 to line L5, respectively, of FIG. 4.

The ECU 400 (see FIG. 2) limits the hydraulic pressure of the brake fluid to 3 bar as shown in FIG. 6(*c*) when the hydraulic pressure of the brake fluid rises. When the ECU 400 limits the hydraulic pressure of the brake fluid to 3 bar, the ECU 400 gradually raises the limit on the hydraulic pressure of the brake fluid to 10 bar 1 second after commencing the limiting of the hydraulic pressure. It is preferred that the amount of rise of the hydraulic pressure at this time be larger than 0 bar/s and equal to or less than 10 bar/s.

When 1 second elapses after commencing the limiting of the hydraulic pressure, the ECU 400 further allows the hydraulic pressure of the brake fluid to rise to 20 bar after 0.3 second. It is preferred that the amount of rise of the hydraulic pressure at this time be larger than 0 bar/s and equal to or less than 50 bar/s.

Figure 7:
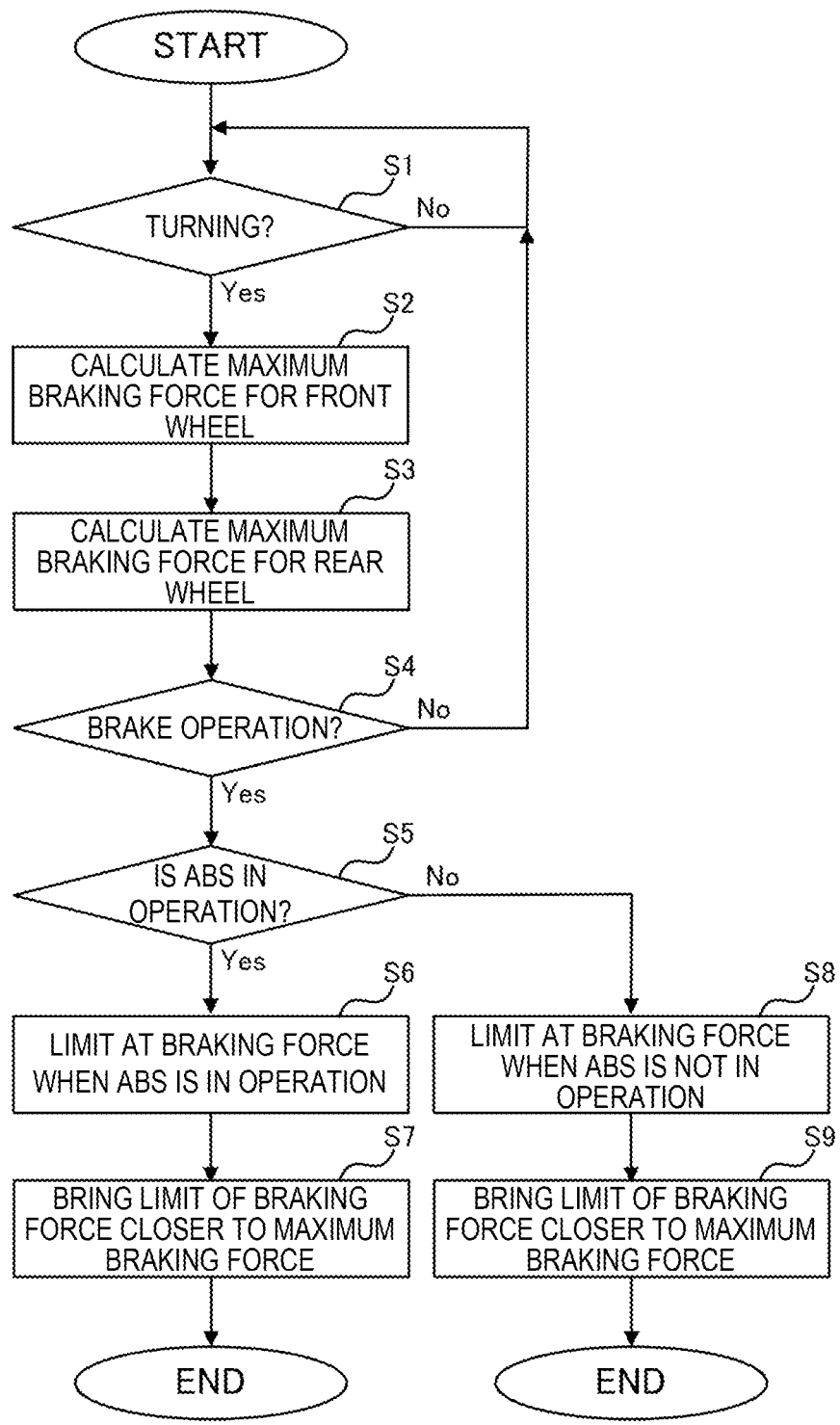
FIG. 7 is a flowchart showing brake control processing while a vehicle body is turning.

FIG. 7 is a flowchart showing brake control processing while the vehicle body is turning.

When executing the brake control processing in the present embodiment, first, the ECU 400 judges whether or not the vehicle body is turning (step S1). This judgment is performed on the basis of the lean angle signal acquired from the lean angle sensor 110 and so forth.

When the ECU 400 judges in step S1 that the vehicle body is not turning (step S1: No), the ECU 400 repeats the processing of step S1 until it judges that the vehicle body is turning.

When the ECU 400 judges in step S1 that the vehicle body is turning (step S1: Yes), the ECU 400 calculates the maximum braking force with which slipping of the front wheel will not arise and updates the maximum braking force for the front wheel resulting from the previous calculation that had been stored to the newly calculated maximum braking force (step S2). Next, the ECU 400 calculates the maximum braking force with which slipping of the rear wheel will not arise and updates the maximum braking force for the rear wheel resulting from the previous calculation that had been stored to the newly calculated maximum braking force (step S3). The order of step S1 to step S3 is arbitrary.

When the ECU 400 calculates the maximum braking forces for the front wheel and the rear wheel in step S2 and step S3, the ECU 400 judges whether or not there has been a brake operation by the driver (step S4).

When the ECU 400 judges that there has not been a brake operation by the driver (step S4: No), the ECU 400 repeats the series of processing steps from step S1.

When the ECU 400 judges that there has been a brake operation by the driver (step S4: Yes), the ECU 400 judges whether or not the ABS is in operation (step S5).

When the ECU 400 judges in step S5 that the ABS is in operation (step S5: Yes), the ECU 400 limits the braking forces on the front wheel and the rear wheel to the predetermined percentages, corresponding to when the ABS is in operation, of the maximum braking forces calculated in step S2 and step S3 (step S6). At this time, the ECU 400 also makes the amount of reduction of the braking force; that is, the amount of reduction at the time of reduction of the hydraulic pressure; smaller than in a case where a turning force is not arising in the vehicle body.

When the ECU 400 limits the braking forces on the front wheel and the rear wheel in step S6, the ECU 400 gradually brings the braking forces on the front wheel and the rear wheel that have been limited closer to the maximum braking forces calculated and updated in step S2 and step S3 (step S7).

When the ECU 400 judges in step S5 that the ABS is not in operation (step S5: No), the ECU 400 limits the braking forces on the front wheel and the rear wheel to the predetermined percentages, corresponding to when the ABS is not in operation, of the maximum braking forces calculated in step S2 and step S3 (step S8). At this time, the limiting of the braking forces on the front wheel and rear wheel is held constant for the predetermined amount of time.

When the ECU 400 limits the braking forces on the front wheel and the rear wheel in step S8, the ECU 400 gradually brings the braking forces on the front wheel and the rear wheel that have been limited closer to the maximum braking forces calculated and updated in step S2 and step S3 (step S9). In the present embodiment, in step S8 and step S9, when the ECU 400 detects slipping of the front wheel or the rear wheel, the ECU 400 cancels the limiting of the braking forces on the front wheel and the rear wheel and causes the ABS to operate.

Because of the above processing, the ECU 400 can limit the braking forces on the front wheel and the rear wheel and gradually raise the limited braking forces to the maximum braking forces when there has been a brake operation by the driver during turning of the vehicle body.

In the present embodiment, the ECU 400 can calculate the maximum braking forces for the front wheel and the rear wheel, update the maximum braking forces as new maximum braking forces, limit the braking forces on the front wheel and the rear wheel to the predetermined percentages of the corresponding maximum braking forces when there has been a brake operation, and thereafter bring the limits on the braking forces on the front wheel and the rear wheel closer to the corresponding maximum braking forces. Because of this, it can be ensured that the braking forces do not change suddenly, and the rise of the bank angle of the vehicle body and the sliding of the rear wheel can be made smooth. For this reason, unstable behavior of the vehicle body that arises during braking while turning can be controlled. Further, because the behavior of the vehicle body becomes gentle and stability improves, the driver can further control the vehicle body in accordance with the situation by ensuring that the vehicle body can turn as much as possible by easing up on the brakes during braking to heighten the grip force in the lateral direction of the tires or raising the braking force to further raise deceleration by continuing to strongly operate the brakes. Moreover, in the present embodiment, by using the theory of the friction circle, it is not necessary to strictly estimate the hydraulic pressure of the brake fluid at which the wheels lock.

Further, the brake control in the present embodiment is executed even when the ABS is in operation. Because of this, in the intermittent increases and decreases of the hydraulic pressure of the brake fluid when the ABS is in operation, the slope of the pressure increase at the times when the hydraulic pressure is increased can be made gentle. For this reason, sudden movements of the vehicle body can be controlled even when the ABS is in operation. Further, the ABS can be operated appropriately even during turning, so a balance in the performance of the ABS between when the vehicle body is traveling in a straight line and when the vehicle body is turning can be achieved.

The present invention has been described above on the basis of the embodiment, but the present invention is not limited to this. For example, in the above-described embodiment, the ECU 400 calculates the turning force on the basis of the lean angle detected by the lean angle sensor 110, but the present invention is not limited to this. A lateral acceleration sensor or the like that simply detects acceleration in the lateral direction may also be used instead of the lean angle sensor provided that it can detect the turning force acting on the vehicle body.

Further, in the above-described embodiment, control of the hydraulic pressure of the brake fluid supplied to three calipers; that is, three channels; comprising the front wheel-side first and second calipers 115*a* and 115*b* and the rear wheel-side caliper 215 was described, but the present invention is not limited to this. The ECU 400 may also control the hydraulic pressure of the brake fluid supplied to two channels or four channels, for example, provided that it can automatically increase the hydraulic pressure of the brake fluid supplied to the brake calipers; that is, increase the pressure of the brake fluid; and bring the braking forces that had been limited closer to the maximum braking forces.

Moreover, in the above-described embodiment, in step S7, the ECU 400 gradually brings the braking forces on the front wheel and the rear wheel that have been limited closer to the maximum braking forces without changing the maximum braking forces that have been calculated one time in step S2 and step S3, but the present invention is not limited to this. For example, the ECU 400 may also repeatedly calculate the maximum braking forces for the front wheel and the rear wheel and update the maximum braking forces used to limit the braking forces each time the ECU 400 calculates them, because the load of each wheel and the lean angle continue to change as the ECU 400 brings the braking forces that have been limited closer to the maximum braking forces.

Reference Signs List

100 Front Wheel Hydraulic Circuit
101 Brake Lever
103 Front Wheel-side Master Cylinder
110 Lean Angle Sensor
115*a* Front Wheel-side First Caliper
115*b* Front Wheel-side Second Caliper
119 Front Wheel-side Hydraulic Pump
200 Rear Wheel Hydraulic Circuit
201 Brake Pedal
203 Rear Wheel-side Master Cylinder
215 Rear Wheel-side Caliper
219 Front Wheel-side Hydraulic Pump
300 DC Motor
400 ECU

The invention claimed is:

1. A brake control method for when a two-wheeled motor vehicle is turning, the brake control method comprising:
   judging whether or not the two-wheeled motor vehicle is turning;
   calculating a maximum braking force with which slipping of a front wheel will not arise and updating, on the basis of the calculation result, a stored maximum braking force for the front wheel;
   calculating a maximum braking force with which slipping of a rear wheel will not arise and updating, on the basis of the calculation result, a stored maximum braking force for the rear wheel;
   limiting the braking forces on the front wheel and the rear wheel to predetermined percentages of the corresponding maximum braking forces in a case where there has been a brake operation by a driver during turning; and
   bringing the braking forces on the front wheel and the rear wheel that have been limited closer to the corresponding updated maximum braking forces.

2. The brake control method according to claim 1, wherein the maximum braking force for the front wheel or the rear wheel is calculated on the basis of the force in the lateral direction acting on the two-wheeled motor vehicle during turning.

3. The brake control method according to claim 1, wherein the maximum braking force for the front wheel or the rear wheel is calculated on the basis of the speed, lean angle, or each axle load of the two-wheeled motor vehicle.

4. The brake control method according to claim 1, wherein in the act of bringing the braking forces on the front wheel and the rear wheel that have been limited closer to the corresponding maximum braking forces, the amount of rise of the braking forces on the front wheel and the rear wheel is gradually made larger.

5. The brake control method according to claim 1, wherein the limiting of the braking forces on the front wheel and the rear wheel is held at constant braking forces for a predetermined amount of time after commencing the limiting.

6. The brake control method according to claim 1, further comprising the act of calculating the coefficient of friction of the front wheel or the rear wheel with respect to a road surface beforehand on the basis of the ground contact condition of the rear wheel with respect to the road surface while the two-wheeled motor vehicle is accelerating, wherein in the act of calculating the maximum braking force for the front wheel or the rear wheel, the coefficient of friction that has been calculated is used to calculate the maximum braking force for the front wheel or the rear wheel.

7. The brake control method according to claim 1, further comprising the act of judging whether or not an ABS is in operation, wherein the predetermined percentages differ depending on whether or not the ABS is in operation.

8. The brake control method according to claim 7, wherein in the intermittent increases and decreases of the braking forces by the ABS, the amount of decrease is smaller in a case where the two-wheeled motor vehicle is turning than in a case where the two-wheeled motor vehicle is not turning.

9. The brake control method according to claim 1, wherein the maximum braking force for the front wheel or the rear wheel is calculated on the basis of the lean angle of the two-wheeled motor vehicle.

10. The brake control method according to claim 1, wherein the maximum braking force for the front wheel or the rear wheel is calculated on the basis of each axle load of the two-wheeled motor vehicle.

11. A brake system that performs brake control when a two-wheeled motor vehicle is turning, wherein the brake system
   judges whether or not the two-wheeled motor vehicle is turning,
   calculates a maximum value of a braking force with which slipping of a front wheel will not arise and a maximum braking force with which slipping of a rear wheel will not arise,
   updates, on the basis of the calculation results, stored maximum braking forces for the front wheel and the rear wheel,
   limits the braking forces on the front wheel and the rear wheel to predetermined percentages of the corresponding maximum braking forces in a case where there has been a brake operation by a driver during turning, and
   brings the braking forces on the front wheel and the rear wheel that have been limited closer to the corresponding updated maximum braking forces.

12. The brake system according to claim 11, wherein the maximum braking force for the front wheel or the rear wheel is calculated on the basis of the force in the lateral direction acting on the two-wheeled motor vehicle during turning.

13. The brake system according to claim 11, wherein the maximum braking force for the front wheel or the rear wheel is calculated on the basis of the speed of the two-wheeled motor vehicle.

14. The brake system according to claim 11, wherein when bringing the braking forces on the front wheel and the rear wheel that have been limited closer to the corresponding maximum braking forces, the brake system gradually makes the amount of rise of the braking forces on the front wheel and the rear wheel larger.

15. The brake system according to claim 11, wherein the limiting of the braking forces on the front wheel and the rear wheel is held at constant braking forces for a predetermined amount of time after commencing the limiting.

16. The brake system according to claim 11, wherein the brake system calculates the coefficient of friction of the front wheel or the rear wheel with respect to a road surface beforehand on the basis of the ground contact condition of the rear wheel with respect to the road surface while the two-wheeled motor vehicle is accelerating, and when calculating the maximum braking force for the front wheel or the rear wheel, the brake system uses the coefficient of friction that has been calculated to calculate the maximum braking force for the front wheel or the rear wheel.

17. The brake system according to claim 11, wherein the brake system judges whether or not an ABS is in operation, and the predetermined percentages differ depending on whether or not the ABS is in operation.

18. The brake system according to claim 17, wherein in the intermittent increases and decreases of the braking force by the ABS, the amount of decrease is smaller in a case where the two-wheeled motor vehicle is turning than in a case where the two-wheeled motor vehicle is not turning.

19. The brake system according to claim 11, wherein the maximum braking force for the front wheel or the rear wheel is calculated on the basis of the lean angle of the two-wheeled motor vehicle.

20. The brake system according to claim 11, wherein the maximum braking force for the front wheel or the rear wheel is calculated on the basis of each axle load of the two-wheeled motor vehicle.

* * * * *